Patented Jan. 9, 1934

1,943,179

UNITED STATES PATENT OFFICE 1,943,179

PREPARATION OF NONDYEING METALLIFEROUS SULPHURIZED PHENOL DERIVATIVES

Valentin Kartaschoff and Oskar Knecht, Basel, Switzerland, assignors to the firm Chemical Works Formerly Sandoz, Basel, Switzerland No Drawing. Application March 30, 1931, Serial No. 526,562, and in Germany April 8, 1930

10 Claims. (Cl. 260—18)

The present invention relates to an improved process for the preparation of metalliferous sulphurized phenol derivatives.

Different processes for the preparation of metalliferous sulphurized phenol derivatives are known (see U. S. Patent application Ser. No. 486,050, filed October 2, 1930, and U. S. Patent application Ser. No. 521,399, filed March 9, 1931, by one of said applicants).

It has now been found that similar compounds can be prepared by heating phenols with sulphur in presence of metals of the hydrogensulphide and ammoniumsulphide groups and their salts and of suitable additional compounds that act as accelerators for the sulphurizing operation. Such additional compounds are for instance the salts of organic carboxylic acids, like acetates, formates, lactates; salts of weak inorganic acids, like nitrites, hydrosulphites, thiosulphates, thionates, sulphhydrates; or bodies like aniline, iodine and the like. The quantities of such additional compounds used may be varied within wide limits, but already small additions are suitable for carrying out the present process.

As salts of the metals of the hydrogensulphide and ammoniumsulphide group it is preferable to use salts of weak inorganic acids like sulphites, nitrites and so on or salts of organic carboxylic and sulphonic acids such as formates, lactates, benzoates, p-toluenesulphonates and the like. Oxides and hydroxides may also advantageously be used, whereas the use of sulphates and chlorides is inconvenient in so far as the reaction proceeds only slowly and higher temperatures must be used.

To carry out the improved process mixtures consisting of phenols, sulphur, metals of the hydrogensulphide and ammonium sulphide groups or their salts and of compounds as cited above or mixtures thereof are heated in presence or in absence of water or suitable organic solvents, whereby a strong evolution of hydrogensulphide occurs. According to the quantity of accelerator used, the end of the reaction can be reached in a very short time, whereby the obtained melt consists of a mixture of free metalliferous thioacids which are almost insoluble in water.

By subjecting the melt thus obtained to a heating operation in presence of a sufficient amount of an alkali, it is transformed into an easily water soluble alkali metal salt and the metalliferous compounds can be isolated from their aqueous solutions by evaporating to dryness or by salting them out in the usual manner.

The metalliferous thiophenol derivatives prepared according to the improved process are in the dry state more or less colored powders, soluble in water and in alkaline solutions in the form of their alkali metal salts. On addition of mineral acids to such solutions the more or less colored insoluble free thioacids are precipitated and on addition of earth-alkali metal- or heavy metal salts insoluble precipitates are observed.

The products prepared according to the described process possess mordanting, tanning and reserving properties and may further be employed as insecticides and as intermediate products for the manufacture of dyestuffs and pharmaceutical products.

The following examples, whilst being not limitative, illustrate the improved process, the parts being by weight.

*Example 1*

188 parts of phenol, 120 parts of sulphur and 20 parts of finely ground molybdenum oxide are heated under addition of a small quantity of iodine as accelerator on a reflux condenser for 48 hours to a temperature of 145–150° C., whereby great quantities of hydrogen sulphide escape. The condensation being achieved, the obtained melt is dissolved in water under addition of caustic soda and the product precipitated from the solution by means of common salt.

The brownish powder thus obtained easily dissolves in water yielding a clear brown solution. On addition to its dilute solution of dilute acetic acid no precipitation occurs, but on addition of mineral acids the free thioacid separates out in form of a brown precipitate; with ferrichloride, a brown black and when treated with bromine, a dark grey precipitate is obtained.

The new molybdenum containing product obtained as above described yields with basic dyestuffs insoluble lakes and may be used instead of tannin.

*Example 2*

180 parts of phenol, 40 parts of finely powdered tin hydroxide, 100 parts of sulphur and 10 parts of sodium nitrite as accelerator are heated on a reflux condenser during 40 hours to a temperature of 140–160° C., whereupon the obtained melt is worked up as described in Example 1.

The brownish powder thus obtained, easily dissolves in water yielding clear yellowish solutions. On addition to its dilute solution of dilute acetic acid no precipitation occurs, but on addition of mineral acids, the free thioacid separates out in form of a yellow precipitate. With ferrichloride it yields a grey blue, and when treated with bromine a brown precipitate.

The new product possesses the property of protecting wool against taking up substantive and acid dyestuffs and may also be used instead of tannin for fixing basic dyestuffs on textile fibres or substrata.

*Example 3*

100 parts of phenol, 23 parts of chromium acetate, 60 parts of sulphur and 5 parts of sodium acetate as accelerator are heated for 12 hours to a temperature of 170–190° C. and the obtained melt is then worked up as above described.

The green powder thus obtained easily dissolves in water yielding a brownish solution. On addition to its solution of dilute acids, the free thioacid separates out in form of a greyish precipitate. With ferrichloride it yields a brown and when treated with bromine a clear brown precipitate.

The chromium containing product thus obtained possesses strong tanning properties.

*Example 4*

100 parts of phenol, 40 parts of sulphur, 5 parts of aluminium powder and 10 parts of sodium nitrite as accelerator are mixed together and heated during 48 hours to a temperature of 130–145° C. To the obtained thick melt there are then added 16 parts of sodium hydroxide, 47 parts of sodium carbonate and 60 parts of water and the mixture obtained is heated for about 1 hour to 100–105° C. under stirring. The fluid mass thus obtained is diluted with 400 parts of hot water, filtered and evaporated to dryness.

The greenish grey powder thus obtained posesses excellent mordanting properties without coloring the textile fibres and may be used instead of tannin for fixing basic dyestuffs.

*Example 5*

100 parts of cresol mixture, 28 parts of sulphur, 17 parts of tin in small pieces and 25 parts of sodium nitrite as accelerator are heated during 36 hours to a temperature of 130–135° C. To the obtained dark green melt 22 parts of sodium hydroxide, 60 parts of soda and 50 parts of water are added and the mixture obtained is heated for about 2 hours under good stirring to 100–110° C. The thick paste obtained in this way is diluted with 350 parts of water, filtered and evaporated to dryness.

The greenish product thus obtained possesses the property of preserving animal fibres against the taking up of substantive and acid dyestuffs.

What we claim is:—

1. A process for the manufacture of non-dyeing metalliferous phenol derivatives, consisting in heating phenols other than those containing nitrogen, with a compound of a polyvalent metal containing partial valences in presence of sulphur and an accelerator selected from the class consisting of the salts of organic and weak inorganic acids and iodine and treating the condensation products thus obtained with an alkali selected from the class consisting of alkali metal carbonates and hydroxides.

2. A process for the manufacture of non-dyeing metalliferous phenol derivatives, consisting in heating phenols of the benzene series other than those containing nitrogen, with a compound of a polyvalent metal containing partial valences in presence of sulphur and an accelerator selected from the class consisting of the salts of organic and weak inorganic acids and iodine and treating the condensation products thus obtained with an alkali selected from the class consisting of alkali metal carbonates and hydroxides.

3. A process for the manufacture of non-dyeing metalliferous phenol derivatives, consisting in heating phenols of the benzene series other than those containing nitrogen, with a compound of a polyvalent metal containing partial valences in presence of sulphur and an alkali metal salt of a weak acid and treating the condensation products thus obtained with an alkali selected from the class consisting of alkali metal carbonates and hydroxides.

4. A process for the manufacture of non-dyeing metalliferous phenol derivatives, consisting in heating phenols of the benzine series other than those containing nitrogen, with a compound of a polyvalent metal containing partial valences in presence of sulphur and sodium nitrate and treating the condensation products thus obtained with an alkali selected from the class consisting of alkali metal carbonates and hydroxides.

5. A process for the manufacture of non-dyeing metalliferous phenol derivatives, consisting in heating phenols of the benzene series other than those containing nitrogen, with a compound of a metal selected from the group consisting of tin, antimony and chromium, in presence of sulphur and sodium nitrite and treating the condensation products thus obtained with an alkali selected from the class consisting of alkali metal carbonates and hydroxides.

6. A process for the manufacture of non-dyeing metalliferous phenol derivatives, consisting in heating phenol with a tin compound in presence of sulphur and sodium nitrite and treating the condensation products thus obtained with an alkali selected from the class consisting of alkali metal carbonates and hydroxides.

7. A process for the manufacture of non-dyeing metalliferous phenol derivatives, consisting in heating cresol with a tin compound in presence of sulphur and sodium nitrite and treating the condensation products thus obtained with an alkali selected from the class consisting of alkali metal carbonates and hydroxides.

8. A process for the manufacture of non-dyeing metalliferous phenol derivatives, consisting in heating chlorophenol with a tin compound in presence of sulphur and sodium nitrite and treating the condensation products thus obtained with an alkali selected from the class consisting of alkali metal carbonates and hydroxides.

9. The non-dyeing metalliferous sulphurized phenol derivatives which are in dry state non-hygroscopic powders, easily soluble in water, yielding more or less colored precipitates on addition of mineral acids and difficulty soluble compounds with earth alkali metal and heavy metal salts and which possess mordanting, tanning and reserving properties and may be used as insecticides and as intermediates for the production of dyestuffs and pharmaceutical preparations.

10. The non-dyeing tin-containing sulphurized phenol derivatives, which are in dry state grey to brown nonhygroscopic powders, easily soluble in water, but rather difficultly soluble in ethyl alcohol, which aqueous solutions yield on addition of mineral acids white to brown precipitates and which possess mordanting, tanning and reserving properties and may be used as insecticides and for the preparation of dyestuffs.

VALENTIN KARTASCHOFF.
OSKAR KNECHT.